No. 715,593. Patented Dec. 9, 1902.
F. LYON.
WHEEL.
(Application filed May 28, 1902.)
(No Model.)
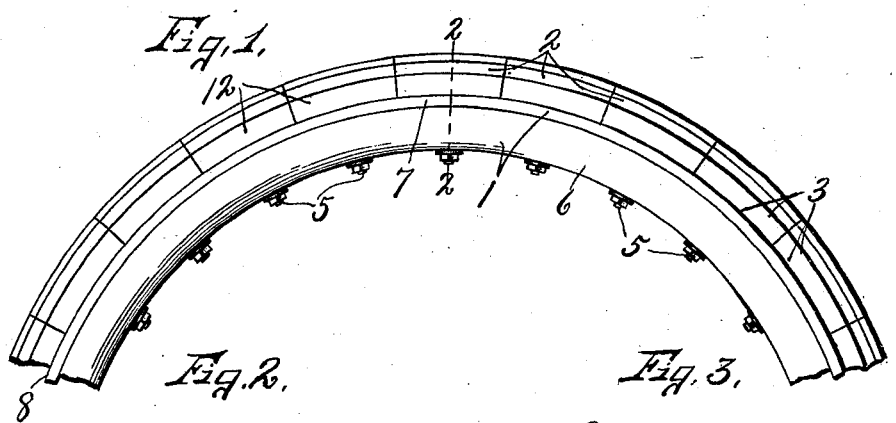
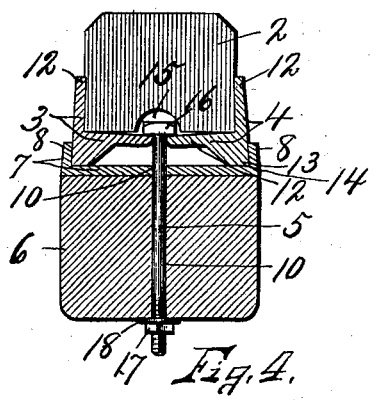
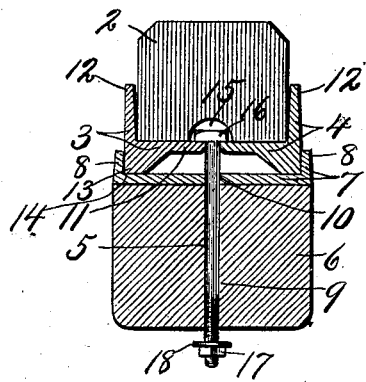
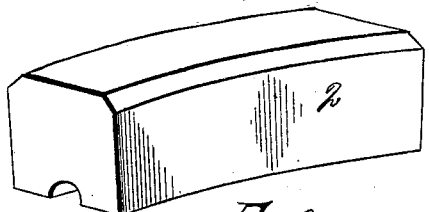
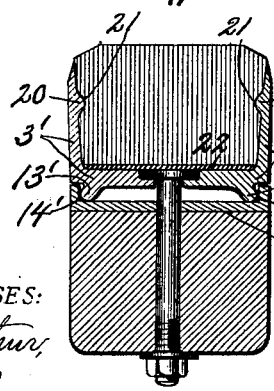
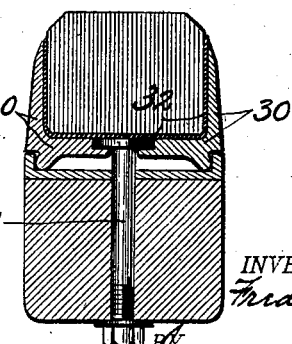
WITNESSES:
INVENTOR
Fred Lyon
Smith & Davison
ATTORNEYS.

UNITED STATES PATENT OFFICE.

FRED LYON, OF ITHACA, NEW YORK, ASSIGNOR OF ONE-HALF TO WILLIAM J. ROMER, OF ITHACA, NEW YORK.

WHEEL.

SPECIFICATION forming part of Letters Patent No. 715,593, dated December 9, 1902.

Application filed May 28, 1902. Serial No. 109,282. (No model.)

*To all whom it may concern:*

Be it known that I, FRED LYON, of Ithaca, in the county of Tompkins, in the State of New York, have invented new and useful Improvements in Wheels, of which the following, taken in connection with the accompanying drawings, is a full, clear, and exact description.

My invention relates to improvements in wheels, having more particular reference to the means for clamping the tire in position upon the rim.

The object of this invention is to produce a simple and efficient means for securing the sections of a sectional tire in operative position, the more specific object being to operate oppositely-arranged clamping members by a single adjusting screw or bolt.

To this end the invention consists in a clamping means for tires, as hereinafter fully described, and pointed out in the claims.

Referring to the drawings, Figure 1 is an elevation of a portion of a wheel, showing the application of my improved clamping device. Figs. 2 and 3 are similar sectional views taken on line 2 2, Fig. 1, the clamps being shown in their operative position in Fig. 2 and in their inoperative position in Fig. 3. Figs. 4 and 5 are perspective views, respectively, of one of the detached tire-sections and one of the clamping-jaws; and Figs. 6 and 7 are sectional views similar to the sections shown in Figs. 2 and 3, showing different modified forms of my invention.

Similar reference characters indicate corresponding parts in all the views.

In the drawings, Figs. 1, 2, and 3, I have shown a portion of a wheel consisting of a felly or rim 1, a sectional tire 2, clamping-jaws 3 and 4, and a clamping-bolt 5. The rim 1 may be of any desired form or construction, being here shown as consisting of an ordinary felly 6 and an annular channel-iron or rim proper, 7, the annular rim or channel-iron 7 being provided with annular flanges 8, projecting outwardly from the opposite edges of the main body of the rim, the intermediate portions of said felly and rim being provided with apertures 9 and 10 for receiving the clamping-bolt 5, presently described.

The clamping-jaws 3 and 4 are usually formed of metal and consist, essentially, of angle-irons arranged in the form of a bell-crank lever in cross-section and provided with inwardly and outwardly projecting flanges 11 and 12, the flanges 11 being disposed in a plane substantially parallel with the axis of the wheel and are adapted to receive and support the tire-section 2, while the flanges 12 are disposed at substantially right angles to the flanges 11 and are arranged to simultaneously engage the opposite faces of the tire 2. These clamping-jaws 3 and 4 are usually reinforced at the junction of the flanges 11 and 12 for forming bearings 13, which engage similar bearings 14, provided on the rim 7, said jaws being fulcrumed in their respective bearings within and against the flanges 8 and are adapted to rock in substantially the same manner as the well-known bell-crank lever, the adjacent edges of the flanges 11 being in close proximity, but slightly separated to receive the adjacent end of the clamping-bolt 5 and permitting the free movement of said flanges 11 during the operation of the clamping or loosening of the tire-sections. These tire-sections may be of any desired form or material, but are preferably formed of wood cut and arranged with the grain running substantially radial of the wheel, each section being provided with a cut-out 15 in its base to receive a head 16 of the clamping-bolt 9. This clamping-bolt 9 is inserted between the meeting edges of the flanges 11 and through the apertures 10 and 9 until the head 16 engages the outer faces of said meeting edges of the flanges 11, the inner end of said bolt extending beyond the inner face of the felly 6 and is usually threaded and provided with an adjusting-nut 17 and the washer 18 for engaging the inner face of the felly when the bolt is adjusted to draw the flanges 12 into engagement with the tire-section 2. I preferably provide a pair of these jaws 3 and 4 for each tire-section, although it is evident that the tire may be continuous and that any suitable number of pairs of clamping-jaws may be employed, it being understood that the essential feature of my invention consists in providing oppositely-arranged clamping-jaws fulcrumed in the rim of the wheel and drawn into operative position by a single clamping-bolt.

In Fig. 6 I have shown oppositely-arranged clamping members 3' and 4', which are also angular in cross-section and are provided with bearings 13', adapted to engage bearings 14' in the rim 7', the only difference in the jaws being that the bearings 13' are rounding in cross-section and the outwardly-extending flanges are provided with ribs 20, adapted to engage the opposite faces of the tire.

When the tire is formed of wood or other hard material, I usually provide the same with grooves 21, in which the ribs 20 are readily seated when the jaws are rocked to their clamping position. In this structure (shown in Fig. 6) I have also provided a suitable elastic cushion or filling, as a rubber band 22, which is interposed between the tire and the horizontal flanges of the jaws 3' and 4', the meeting edges of said jaws being usually recessed in their outer faces for receiving the head of a clamping-bolt 5'.

In Fig. 7 I have shown a further modified form of tire-holding means, consisting of jaws 30, a clamping-bolt 31, and a flexible packing or filling 32, interposed between the flanges of the jaws and the adjacent surface of the tire.

The operation of my invention will now be readily understood upon reference to the foregoing description and the accompanying drawings.

Having thus described my invention, what I claim, and desire to secure by Letters Patent, is—

1. In combination with a rim and tire, oppositely-arranged rocking clamping-jaws fulcrumed in the rim and engaging the inner and side faces of the tire and means for engaging the jaws and rim simultaneously rocking the jaws to engage the tire.

2. In combination with a rim and tire, opposite clamping-jaws fulcrumed on the rim and each provided with outwardly-projecting flanges for engaging the lateral faces of the tire and a clamping-bolt passed through the rim and provided with engaging shoulders engaged respectively with the meeting edges of the jaws and with the rim.

3. In combination with a tire and a rim having outwardly-projecting annular flanges, jaws fulcrumed in the angles of the rim formed by said flanges each of said jaws being provided with an inwardly-projecting flange for receiving the inner face of the tire and with an outwardly-projecting flange for engaging the lateral faces of the tire and adjusting means for rocking said jaws upon their fulcrums.

4. In combination with a tire and a rim having bearings in proximity to its opposite longitudinal edges, jaws fulcrumed in said bearings and provided with flanges interposed between the tire and rim and with additional flanges at the side faces of the tire and a bolt engaged with the meeting edges of the flanges for rocking the jaws on their fulcrums.

5. In combination, a rim, opposite jaws fulcrumed on the rim, portions of the jaws extending toward each other and other portions of said jaws engaging the tire, and means acting substantially radially on the former portions to engage the latter portions with the tire.

In witness whereof I have hereunto set my hand this 19th day of May, 1902.

FRED LYON.

Witnesses:
W. J. ROMER,
C. W. MAJOR.